United States Patent [19]
Anderson

[11] Patent Number: 5,096,049
[45] Date of Patent: Mar. 17, 1992

[54] REFUSE CONVEYOR APPARATUS

[76] Inventor: Jeffrey M. Anderson, 131 N. Bower, Space 73, Palisade, Colo. 81526

[21] Appl. No.: 578,680

[22] Filed: Sep. 7, 1990

[51] Int. Cl.⁵ .............................................. B65G 25/00
[52] U.S. Cl. .................................. 198/750; 104/172.3
[58] Field of Search ............................. 198/748, 750; 104/172.3

[56] References Cited

U.S. PATENT DOCUMENTS

| | | | |
|---|---|---|---|
| 875,685 | 1/1908 | Bighouse | 104/172.3 |
| 2,622,745 | 12/1952 | De Forest Roe | 198/748 X |
| 3,685,634 | 8/1972 | Bergling | 198/748 X |
| 3,865,228 | 2/1975 | Hufford | 198/748 |
| 4,044,886 | 8/1977 | Sender | 198/750 X |
| 4,175,656 | 11/1979 | Lang | 198/748 |
| 4,308,945 | 1/1982 | Beckmann et al. | 198/750 |
| 4,556,141 | 12/1985 | Faitel | 198/750 |
| 5,042,642 | 8/1991 | Ullrich | 198/750 |

FOREIGN PATENT DOCUMENTS 0076734  5/1984  Japan .................................. 198/750

Primary Examiner—D. Glenn Dayoan
Assistant Examiner—Cheryl L. Gastineau
Attorney, Agent, or Firm—Leon Gilden

[57] ABSTRACT

An apparatus including a plurality of spaced "C" shaped tracks are mounted upon a support surface adjacent a dwelling, the tracks are fixedly secured within spaced underlying "U" shaped supports to rigidly secure the tracks in position. A medially positioned channel member includes an endless chain loop rotatably mounted therewithin, the chain loop includes an upper and lower flight rotatably mounted within the channel member, including sprockets at each end thereof, with a rear drive sprocket mounted for selective forward and reverse movement of a platform secured to the chain conveyor to permit ease of transport of refuse containers from the dwelling to an orientation forwardly of the dwelling.

6 Claims, 4 Drawing Sheets

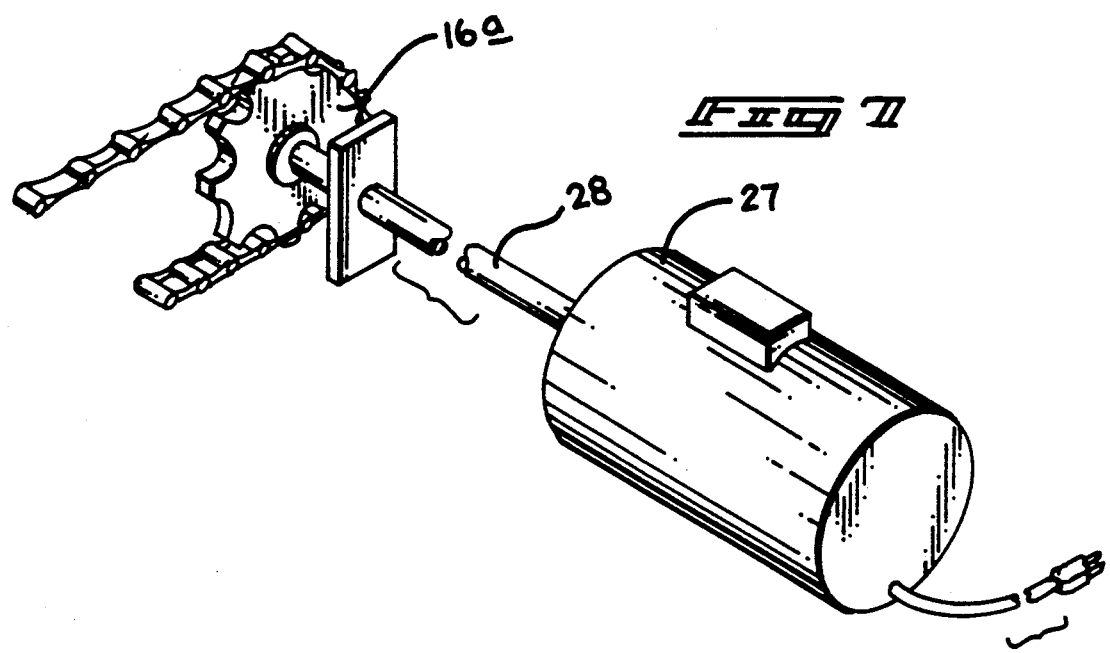
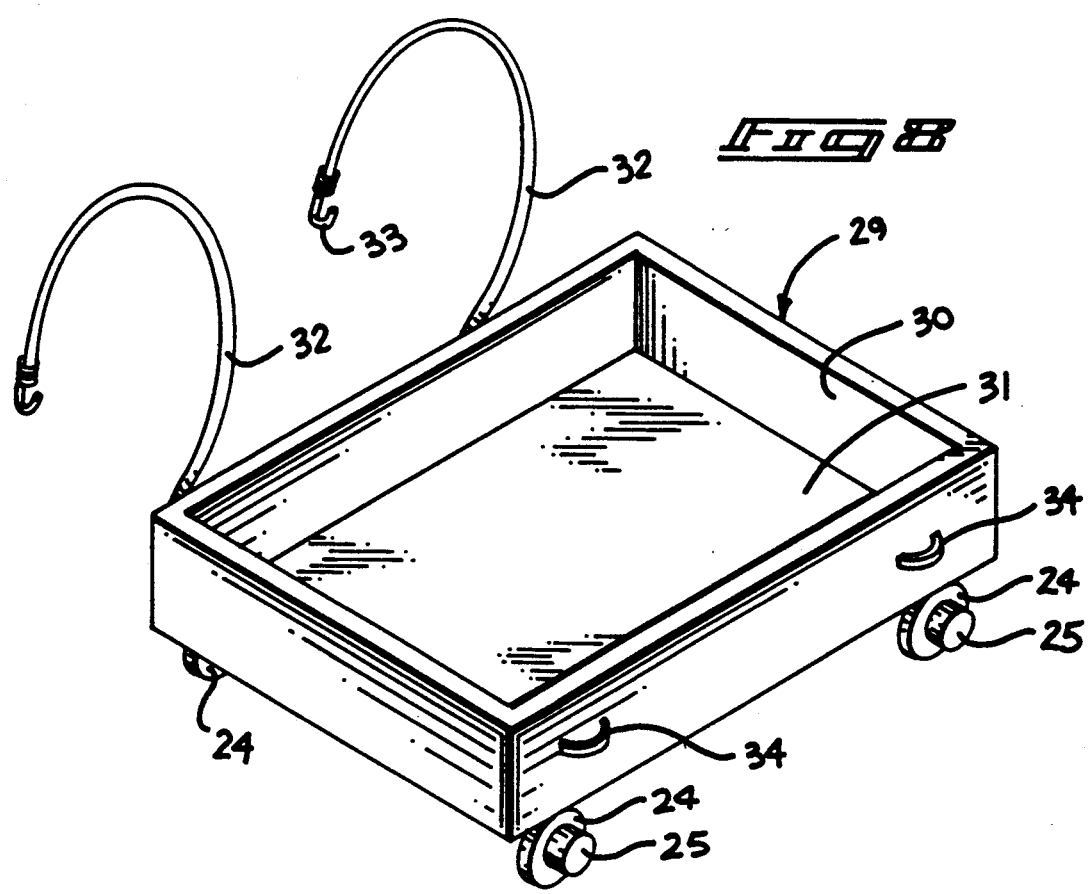

REFUSE CONVEYOR APPARATUS

BACKGROUND OF THE INVENTION

1. Field of the Invention

The field of invention relates to conveyor apparatus, and more particularly pertains to a new and improved refuse conveyor apparatus wherein the same permits selective conveyance of refuse containers and the like relative to an associated dwelling.

2. Description of the Prior Art

Conveyors of various types have been developed in the prior art. Typically, such conveyor apparatus has not been set forth for assistance of individuals of diminished physical capacity in the routine chore of Positioning refuse containers at a curbside orientation relative to an associated dwelling. The instant invention attempts to overcome deficiencies of the prior art by providing a reversing electric motor driven chain conveyor to direct a refuse supporting platform from the dwelling to the curbside orientation. Examples of prior art conveyors may be found in U.S. Pat. No. 4,345,869 to King utilizing a conveyor mounted within the floor portion of a vehicular cargo body for transport of various articles therewithin.

U.S. Pat. No. 4,551,059 to Petoia sets forth a conveyor vehicle provided with interacting links to permit adjustable width of the vehicle in use.

U.S. Pat. No. 4,698,775 to Koch, et al. sets forth a mobile transport unit utilizing a robot-type arm for transport of various articles from the vehicle.

U.S. Pat. No. 2,836,253 to Lovell sets forth a golf caddy utilizing a remote control organization to permit selective movement of the caddy relative to a golf course.

U S. Pat. No. 4,655,669 to Anttila, et al. sets forth a load-handling apparatus including a dolly member self-propelled and controlled by an operator for positioning beneath various loads for transport and positioning thereof.

As such, it may be appreciated that there continues to be a need for a new and improved refuse conveyor apparatus wherein the same addresses both the problems of ease of use, as well as effectiveness in construction and in this respect, the present invention substantially fulfills this need.

SUMMARY OF THE INVENTION

In view of the foregoing disadvantages inherent in the known types of conveyor apparatus now present in the prior art, the present invention provides a refuse conveyor apparatus wherein the same permits relative positioning of refuse containers utilizing a reversible track mounted platform to effect transport of refuse containers from a dwelling to a curbside orientation. As such, the general purpose of the present invention, which will be described subsequently in greater detail, is to provide a new and improved refuse conveyor apparatus which has all the advantages of the prior art conveyor apparatus and none of the disadvantages.

To attain this, the present invention provides an apparatus including a plurality of spaced "C" shaped tracks mounted upon a support surface adjacent a dwelling, wherein the tracks are fixedly secured within spaced underlying "U" shaped supports to rigidly secure the tracks in position. A medially positioned channel member includes an endless chain loop rotatably mounted therewithin, wherein the shank loop includes an upper and lower flight rotatably mounted within the channel member, including sprockets at each end thereof, with a rear drive sprocket mounted for selective forward and reverse movement of a platform secured to the chain conveyor to permit ease of transport of refuse containers from the dwelling to an orientation forwardly of the dwelling.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved refuse conveyor apparatus which has all the advantages of the prior art conveyor apparatus and none of the disadvantages.

It is another object of the present invention to provide a new and improved refuse conveyor apparatus which may be easily and efficiently manufactured and marketed.

It is a further object of the present invention to provide a new and improved refuse conveyor apparatus which is of a durable and reliable construction.

An even further object of the present invention is to provide a new and improved refuse conveyor apparatus which is susceptible of a low cost of manufacture with regard to both materials and labor, and which accordingly is then susceptible of low prices of sale to the consuming public, thereby making such refuse conveyor apparatus economically available to the buying public.

Still yet another object of the present invention is to provide a new and improved refuse conveyor apparatus which provides in the apparatuses and methods of the prior art some of the advantages thereof, while simultaneously overcoming some of the disadvantages normally associated therewith.

Still another object of the present invention is to provide a new and improved refuse conveyor apparatus wherein the same permits selective positioning and transport of refuse containers from a dwelling to a forwardly oriented curbside location.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an isometric illustration of the electric motor in association with the rear sprocket of the instant invention.

FIG. 8 is an isometric illustration of a modified transport cart utilized by the instant invention.

DESCRIPTION OF THE PREFERRED EMBODIMENT

Figure 1:
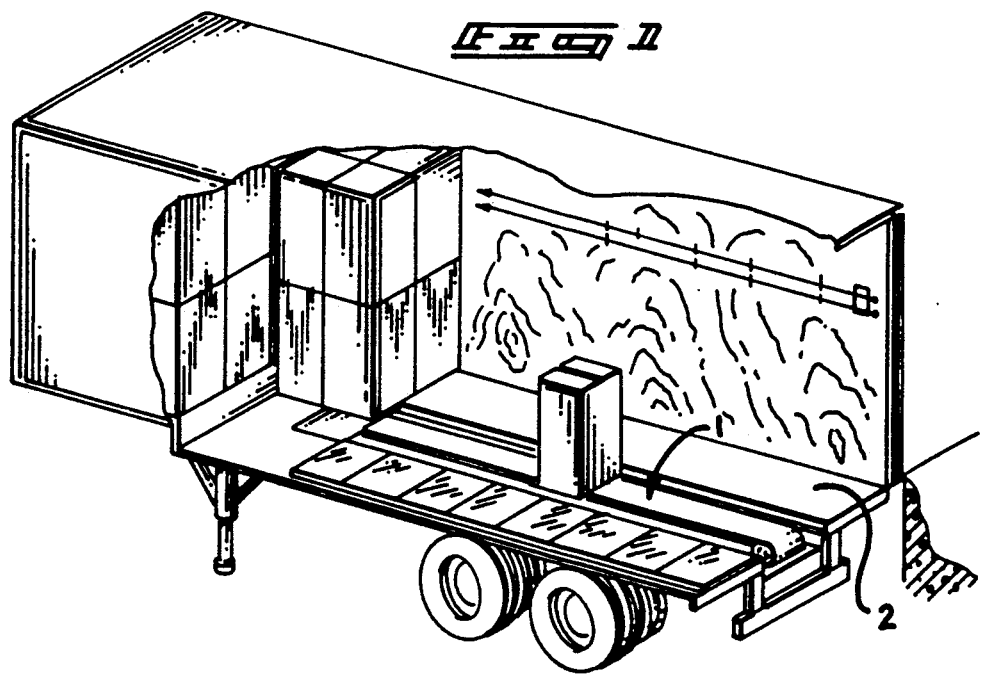
FIG. 1 is an isometric view, partially in section, of a prior art conveyor apparatus.

With reference now to the drawings, and in particular to FIGS. 3 to 8 thereof, a new and improved refuse conveyor apparatus embodying the principles and concepts of the present invention and generally designated by the reference numeral 10 will be described.

Figure 2:
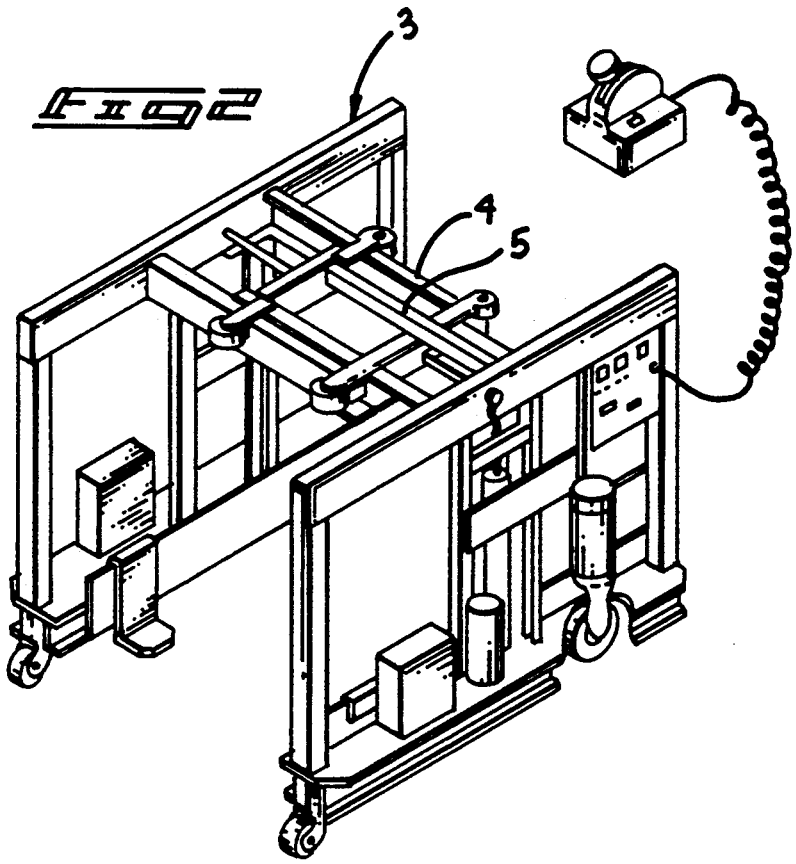
FIG. 2 is an isometric illustration of a further prior art conveyor apparatus.

FIG. 1, per U.S. Pat. No. 4,345,869, illustrates a prior art conveyor apparatus 1 mounted within the floor 2 of a cargo vehicle for transport of various articles within the vehicle. FIG. 2, per U.S. Pat. No. 4,551,059, illustrates a prior art conveyor apparatus 3, wherein cooperating pairs of first and second links 4 and 5 respectively interact to permit accommodation and repositioning of the side portions of the vehicle to permit width adjustment of the vehicle.

More specifically, the refuse conveyor apparatus 10 of the instant invention essentially comprises a pair of tracks, including a first track 11 parallel to and coextensive with a second track 12. The elongate longitudinally aligned and parallel first and second tracks 11 and 12 are each defined by confronting "C" shaped cross-sectional configurations. A channel member 14 of a "C" shaped cross-sectional configuration is coextensive with and positioned medially of the first and second tracks 11 and 12. The channel member 14 includes an endless link chain loop 15 mounted therewithin that includes upper and lower flights. The chain loop 15 includes a forward sprocket 16 and a rear drive sprocket 16a to effect selective rotation of the chain loop 15.

Figure 3:
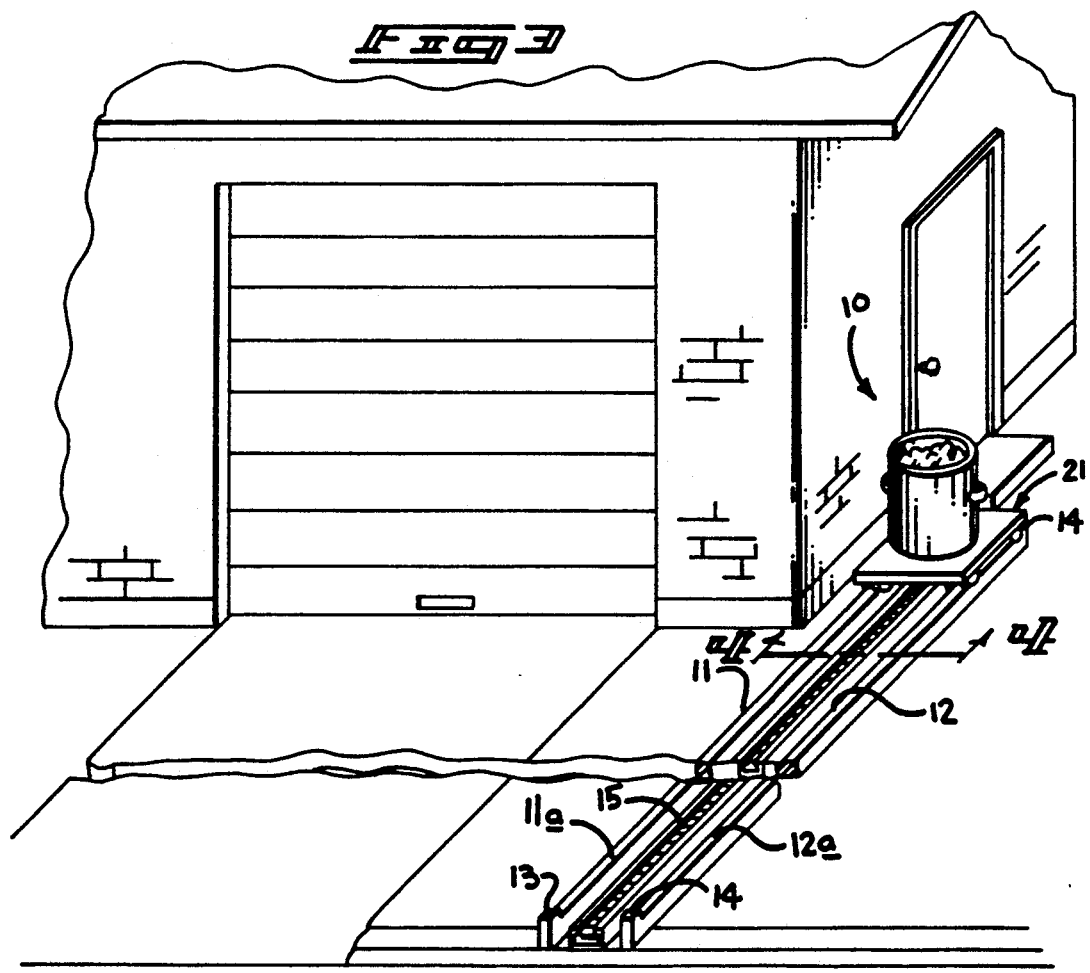
FIG. 3 is an isometric illustration of the instant invention.

Spaced parallel "U" shaped support mounts 17 fixedly secure the channel member 14 medially and coextensively upon an upper surface of each base plate portion 17a of each support mount 17. The support mount includes vertical and parallel legs to secure the first and second tracks to opposed interior surfaces of each of the legs to space the tracks above the channel member 14. A transport cart 21 is mounted on the first and second tracks for transport of various refuse containers, as illustrated in FIG. 3. The transport cart 21 includes a rigid platform 22 formed with spaced parallel axles 23 mounted thereunder. Each axle includes a wheel 24 rotatably mounted at each end of each axle to define a wheel pair.

Figure 4:
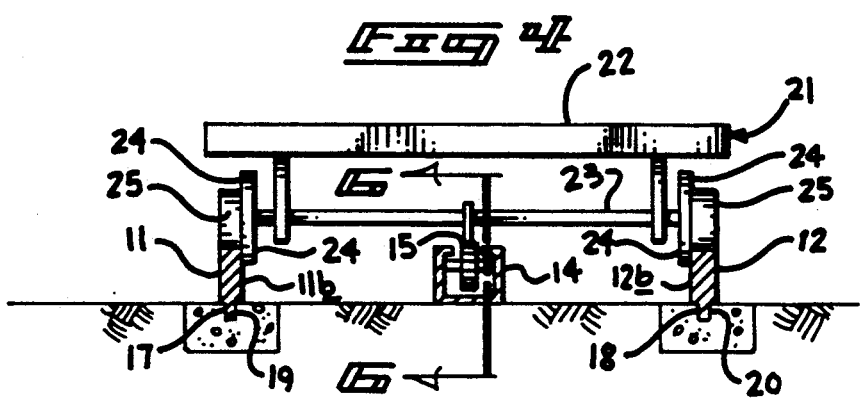
FIG. 4 is a cross-sectional illustration of the cart mounted to the conveyor.
Figure 5:
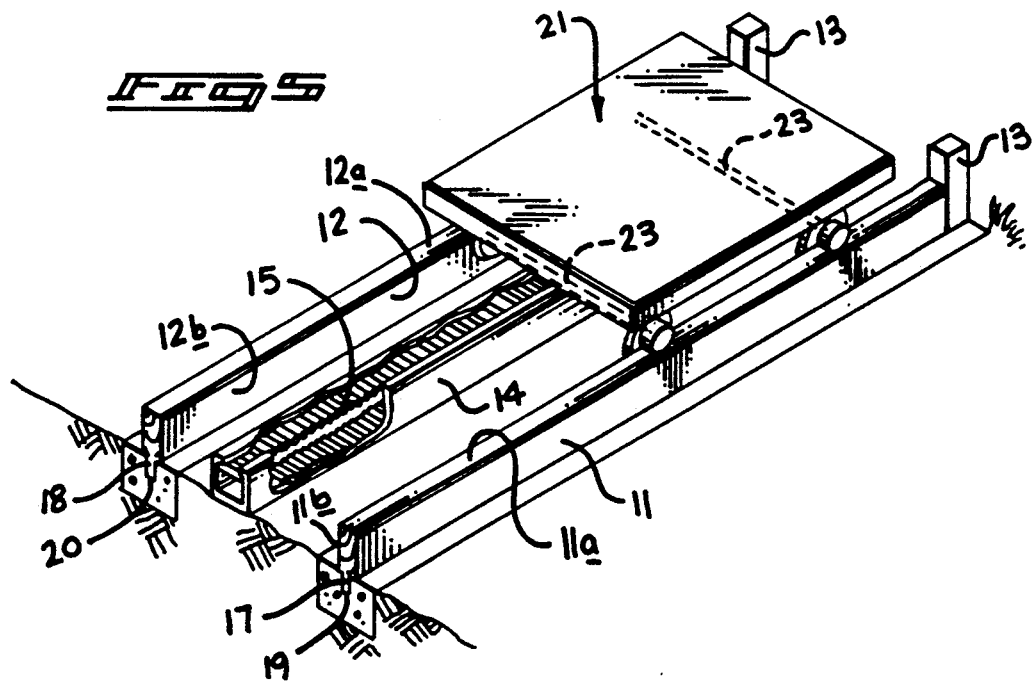
FIG. 5 is an isometric illustration of the conveyor and cart organization, partially in section.

Each wheel of each wheel pair rotatably captured within a respective first and second "C" shaped track is illustrated in FIG. 4. Axle support flanges 18 mount each axle 23 orthogonally relative to each of the first and second tracks.

Figure 6:
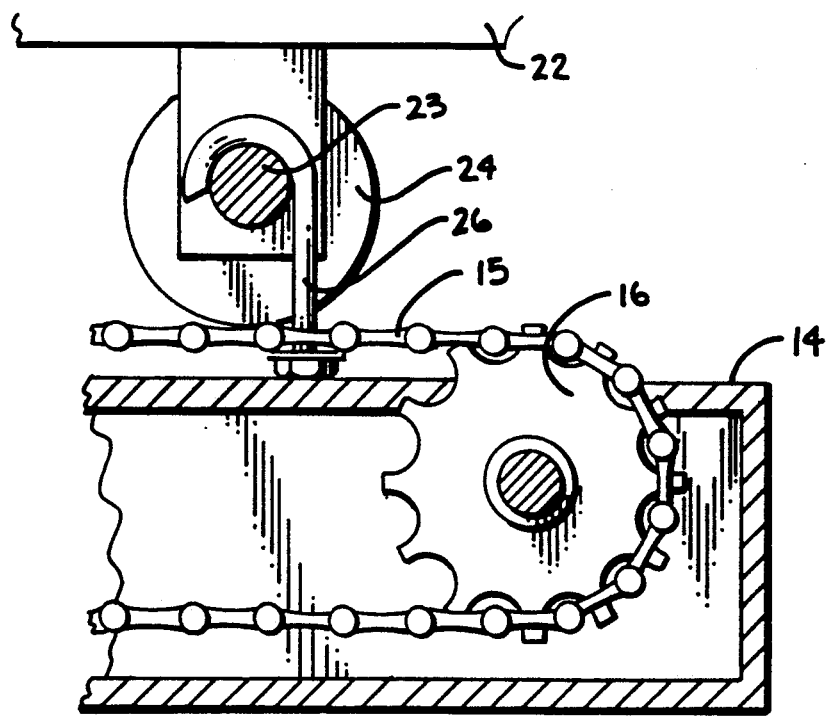
FIG. 6 is an orthographic cross-sectional view of the forward sprocket association with the chain conveyor apparatus of the instant invention.

Reference to FIG. 6 illustrates a hook member 26 fixedly mounted to one of the axles 23 at one end and mounted to the endless chain loop at its other end. The hook member 26 accordingly secures the transport cart to the chain loop for movement of the transport cart in association with the chain loop.

Reference to FIG. 7 illustrates a reversing electric motor 27 selectively actuatable by conventional circuitry as required to permit a forward and rear directing of the transport car 21. The electric motor 27 includes electric motor drive 28 that is coaxially and fixedly mounted to the rear sprocket 16a for rotation of the rear sprocket and associated forward and rear driving of the transport cart 21.

FIG. 8 illustrates a modified cart 29 formed with a perimeter wall 30 that is defined by parallel side walls and parallel end walls fixedly and orthogonally mounted to a planar floor 31. The modified cart 29 utilizes the identical first and second wheel structures 24 and 25 in association with the spaced axles 23 as set forth in reference to the transport cart 21. Elastic cord members 32 are fixedly mounted to first side walls of the parallel side walls of the transport cart 29, and each include elastic cord hooks 33 fixedly mounted at free terminal ends of each elastic cord member for selective securement to one of a pair of associated loops 34 aligned with the elastic cord members 32 for securement of various refuse containers and the like stored within the modified cart 29.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A refuse conveyor apparatus for transport of refuse containers from a dwelling to a curbside orientation relative to the dwelling spaced from the dwelling, wherein the apparatus comprises, a first track and a second track, the first track and second track arranged parallel of and coextensive relative to one another, and the first track includes a first track interior surface, and the second track includes a second track interior surface, wherein the first track and second track interior surfaces are in confronting and parallel relationship to one another, and a transport cart mounted for reciprocating movement overlying the first track and the second track, and drive means mounted medially of the first track and the second track and coextensive therewith, wherein the drive means includes an endless chain loop secured to the transport cart for selective reciprocation of the transport cart relative to the drive means and the first track and the second track, and wherein the drive means further includes an elongate channel member, the channel member defined by a "C" shaped cross-sectional configuration and coextensive with the first track and the second track, and wherein the channel member includes an opened upper end and said endless link chain loop is mounted within the channel member coextensively therewith, the chain loop including a top flight and a bottom flight underlying the top flight, and the chain loop including a hook member mounted to the transport cart at a remote end of the hook member spaced from the chain loop.

2. An apparatus as set forth in claim 1 wherein the first and second tracks are each of a confronting "C" shaped cross-sectional configuration to define an elongate "C" shaped channel within each track.

3. An apparatus as set forth in claim 2 wherein the transport cart includes a forward axle and a rear axle, the hook member mounted medially to one of said axles, and each axle including a wheel fixedly mounted to each end of each axle to define a wheel pair wherein the each wheel of each wheel pair is rotatably captured within a "C" shaped channel of each track.

4. An apparatus as set forth in claim 3 wherein the chain loop includes a forward sprocket and a rear sprocket, the rear sprocket including a motor drive coaxially and fixedly mounted to an axis defined by the rear sprocket, and the motor drive operatively mounted to a reversing electric motor to effect selective rotation of the chain loop relative to the channel member.

5. An apparatus as set forth in claim 4 including a series of spaced "U" shaped mounts orthogonally oriented and positioned underlying the first and second tracks, the "C" shaped channel member medially mounted overlying each mount, and each mount including spaced parallel legs with the first and second tracks mounted to opposed interior surfaces of each of the legs of each mount.

6. An apparatus as set forth in claim 5 wherein the transport cart includes spaced parallel side walls and spaced parallel end walls, each of the side walls and end walls integrally and orthogonally mounted to a planar floor, and a first and second elastic cord member mounted to a first side wall, each elastic cord member including a cord member hook mounted to a free end of each cord member, and each cord member hook selectively securable to one of a plurality of loops, the loops fixedly mounted to a second side wall of the parallel side walls of the transport cart.

* * * * *